US010494934B2

(12) United States Patent
Zemitis et al.

(10) Patent No.: US 10,494,934 B2
(45) Date of Patent: Dec. 3, 2019

(54) TURBINE BLADES HAVING SHANK FEATURES

(71) Applicant: General Electric Company, Schenectady, NY (US)

(72) Inventors: William Scott Zemitis, Simpsonville, SC (US); Richard Ryan Pilson, Greer, SC (US); Felipe Roman-Morales, Simpsonville, SC (US); Melbourne James Myers, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 15/431,968

(22) Filed: Feb. 14, 2017

(65) Prior Publication Data

US 2018/0230828 A1   Aug. 16, 2018

(51) Int. Cl.
   *F01D 5/30*   (2006.01)
(52) U.S. Cl.
   CPC ........ *F01D 5/3007* (2013.01); *F05D 2250/74* (2013.01); *F05D 2260/96* (2013.01); *Y02T 50/673* (2013.01)
(58) Field of Classification Search
   CPC .......... F01D 5/3007; F01D 5/141; F01D 5/16; F01D 11/001; F05D 2260/96; F05D 2250/74; F05D 2230/00; F05D 2230/50
   See application file for complete search history.

(56) References Cited

U.S. PATENT DOCUMENTS

| 3,137,478 A | | 6/1964 | Farrell | |
| 5,980,209 A | * | 11/1999 | Barry | F01D 5/141 416/193 A |
| 6,390,775 B1 | | 5/2002 | Paz | |
| 7,121,803 B2 | | 10/2006 | Gautreau et al. | |
| 7,594,799 B2 | | 9/2009 | Miller et al. | |
| 7,762,779 B2 | | 7/2010 | Zemitis et al. | |
| 8,727,730 B2 | * | 5/2014 | Liotta | F01D 5/282 416/193 A |
| 8,967,974 B2 | * | 3/2015 | Garcia-Crespo | F01D 5/3007 29/889.2 |
| 2012/0051930 A1 | * | 3/2012 | Pandey | F01D 5/143 416/223 A |
| 2015/0010393 A1 | * | 1/2015 | Hafner | F01D 11/003 415/173.7 |
| 2018/0230820 A1 | * | 8/2018 | Zemitis | F01D 5/22 |
| 2018/0230829 A1 | * | 8/2018 | Zemitis | F01D 5/3015 |

* cited by examiner

*Primary Examiner* — Dwayne J White
*Assistant Examiner* — Jackson N Gillenwaters
(74) *Attorney, Agent, or Firm* — Armstrong Teasdale LLP

(57) ABSTRACT

A turbine blade includes an airfoil that extends radially between a root end and a tip end, a platform coupled to the root end, and a shank that extends radially inwardly from the platform. The shank includes a downstream cover plate and a downstream angel wing that extends axially from the downstream cover plate. A portion of the downstream cover plate radially outward of the downstream angel wing defines an approximately linear profile. The turbine blade also includes a dovetail region that extends radially inwardly from the shank. A profile of a portion of the downstream cover plate radially inward of the downstream angel wing is recessed relative to the linear profile.

16 Claims, 8 Drawing Sheets

TURBINE BLADES HAVING SHANK FEATURES

BACKGROUND

The field of the disclosure relates generally to rotary machines, and more particularly, to a blade with shank features that facilitate reducing stress peaks and gradients within the shank.

At least some known rotary machines include a compressor, a combustor coupled downstream from the compressor, a turbine coupled downstream from the combustor, and a rotor shaft rotatably coupled between the compressor and the turbine. Some known turbines include at least one rotor disk coupled to the rotor shaft, and a plurality of circumferentially-spaced turbine blades that extend outward from each rotor disk to define a stage of the turbine. Each turbine blade includes an airfoil that extends radially outward from a platform towards a turbine casing.

At least some known turbine blades include a shank and dovetail radially inward of the platform to facilitate coupling the blade to the rotor disk. In some cases, an angel wing extends laterally outward from the shank towards an adjacent structure within the turbine assembly. An operational life cycle of at least some turbine blades is limited by fatigue as a result of a mean stress field and a vibratory stress field converging to form a stress concentration in an interface between the blade dovetail and the blade shank.

At least some known turbine blades designs are modified to reduce material in certain portions of the dovetail to relieve stresses in the shank-to-dovetail interface. However, at least some known modifications to the dovetail design require complementary modifications to the rotor disk as well. Additionally or alternatively, an effectiveness of at least some known dovetail modifications in reducing stresses in the shank-to-dovetail interface is limited.

BRIEF DESCRIPTION

In one aspect, a turbine blade is provided. The turbine blade includes an airfoil that extends radially between a root end and a tip end, a platform coupled to the root end, and a shank that extends radially inwardly from the platform. The shank includes a downstream cover plate and a downstream angel wing that extends axially from the downstream cover plate. A portion of the downstream cover plate radially outward of the downstream angel wing defines an approximately linear profile. The turbine blade also includes a dovetail region that extends radially inwardly from the shank. A profile of a portion of the downstream cover plate radially inward of the downstream angel wing is recessed relative to the linear profile.

In another aspect, a turbine blade is provided. The turbine blade includes an airfoil that extends radially between a root end and a tip end, a platform coupled to the root end, and a shank that extends radially inwardly from the platform. The shank includes a downstream cover plate and a downstream angel wing that extends axially from the downstream cover plate. The turbine blade also includes a dovetail region that extends radially inwardly from the shank. The shank further includes a generally axially extending region that interfaces with the dovetail region. A profile of the axially extending region includes an inflection point, a first surface that slopes radially inward from the inflection point to the dovetail region, and a second surface that extends generally axially from the inflection point opposite the first surface. A central portion of the second surface slopes radially outward from the inflection point.

In another aspect, a turbine blade is provided. The turbine blade includes an airfoil that extends radially between a root end and a tip end, a platform coupled to the root end, and a shank that extends radially inwardly from the platform. The shank includes a downstream cover plate and a downstream angel wing that extends axially from the downstream cover plate. The turbine blade also includes a dovetail region that extends radially inwardly from the shank. A profile of an underside of the downstream angel wing and a portion of the downstream cover plate radially inward of the downstream angel wing is defined by a plurality of points having coordinates listed in Table 1 subject to a tolerance of about ±0.030 inches. The plurality of points are joined with smooth continuous arcs. Each of the coordinates for the E datum in Table 1 is adjusted based on a difference between a datum distance C1 of the turbine blade and a reference datum distance C1 associated with Table 1.

DETAILED DESCRIPTION

The embodiments of turbine blades described herein include a turbine blade shank in which a profile of a portion of a downstream angel wing and/or a downstream cover plate radially inward of the downstream angel wing facilitates separating and/or reducing a mean stress concentration and a vibratory stress concentration induced to an intersection of the downstream cover plate, a pressure side face, and a dovetail of the blade. In at least some embodiments, these benefits are achieved independently of a design of the dovetail. In some embodiments, a portion of the downstream cover plate radially inward of the angel wing is recessed, relative to a profile of the cover plate radially outward of the angel wing. Additionally or alternatively, in certain embodiments, the shank includes a generally axially extending portion that interfaces with the dovetail, and a central portion of the surface slopes radially outward.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a gas turbine engine, and the term "downstream" refers to an downstream or nozzle end of the gas turbine engine.

Figure 1:
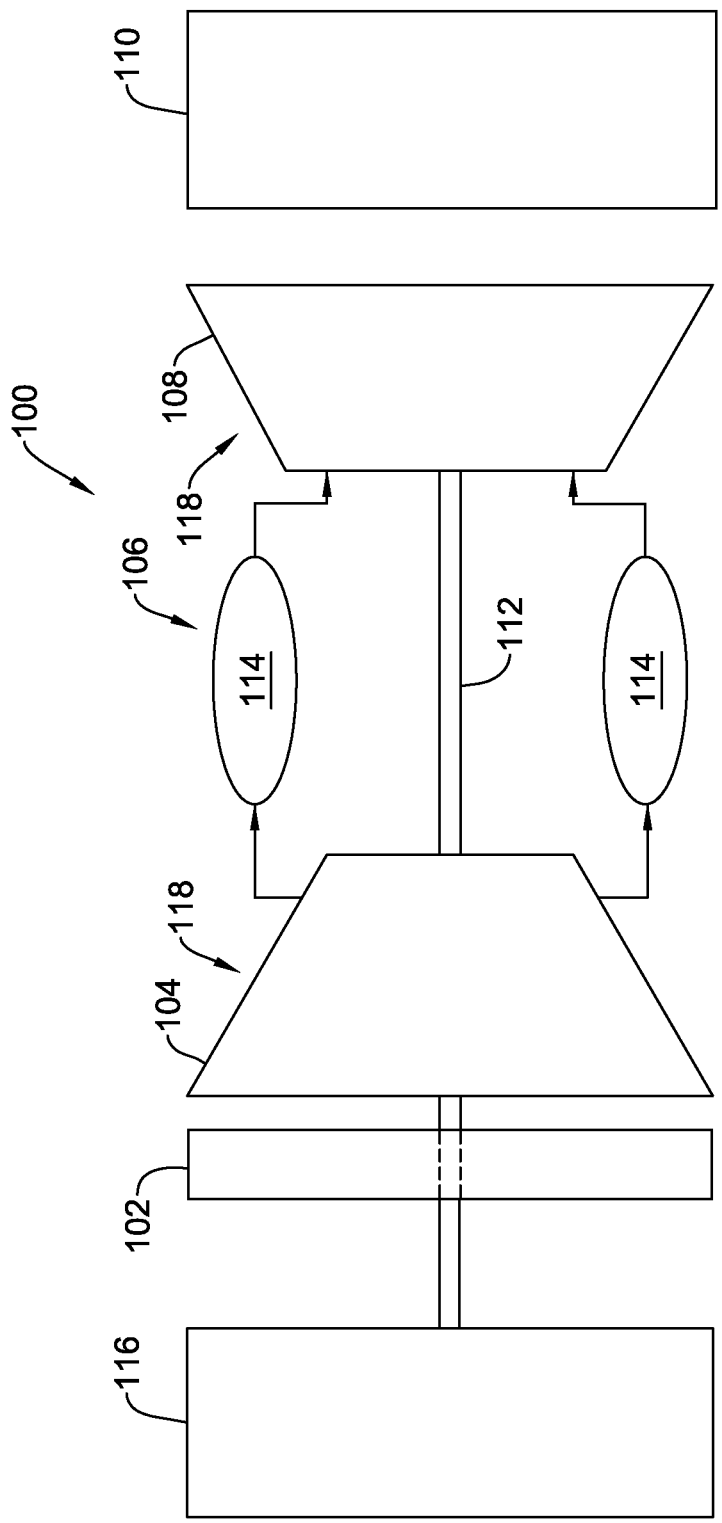
FIG. 1 is a schematic view of an exemplary rotary machine.

FIG. 1 is a schematic view of an exemplary rotary machine 100. In the exemplary embodiment, rotary machine 100 is a gas turbine engine. Alternatively, rotary machine 100 is any other turbine engine and/or rotary machine, including, without limitation, a steam turbine engine, a gas turbofan aircraft engine, other aircraft engine, a wind turbine, a compressor, and a pump. In the exemplary embodiment, gas turbine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. In the exemplary embodiment, combustor section 106 includes a plurality of combustors 114. Combustor section 106 is coupled to compressor section 104 such that each combustor 114 is in flow communication with the compressor section 104. Turbine section 108 is further coupled to a load 116 such as, but not limited to, an electrical generator and/or a mechanical drive application. In the exemplary embodiment, each compressor section 104 and turbine section 108 includes at least one rotor assembly 118 that is coupled to rotor shaft 112.

Figure 2:
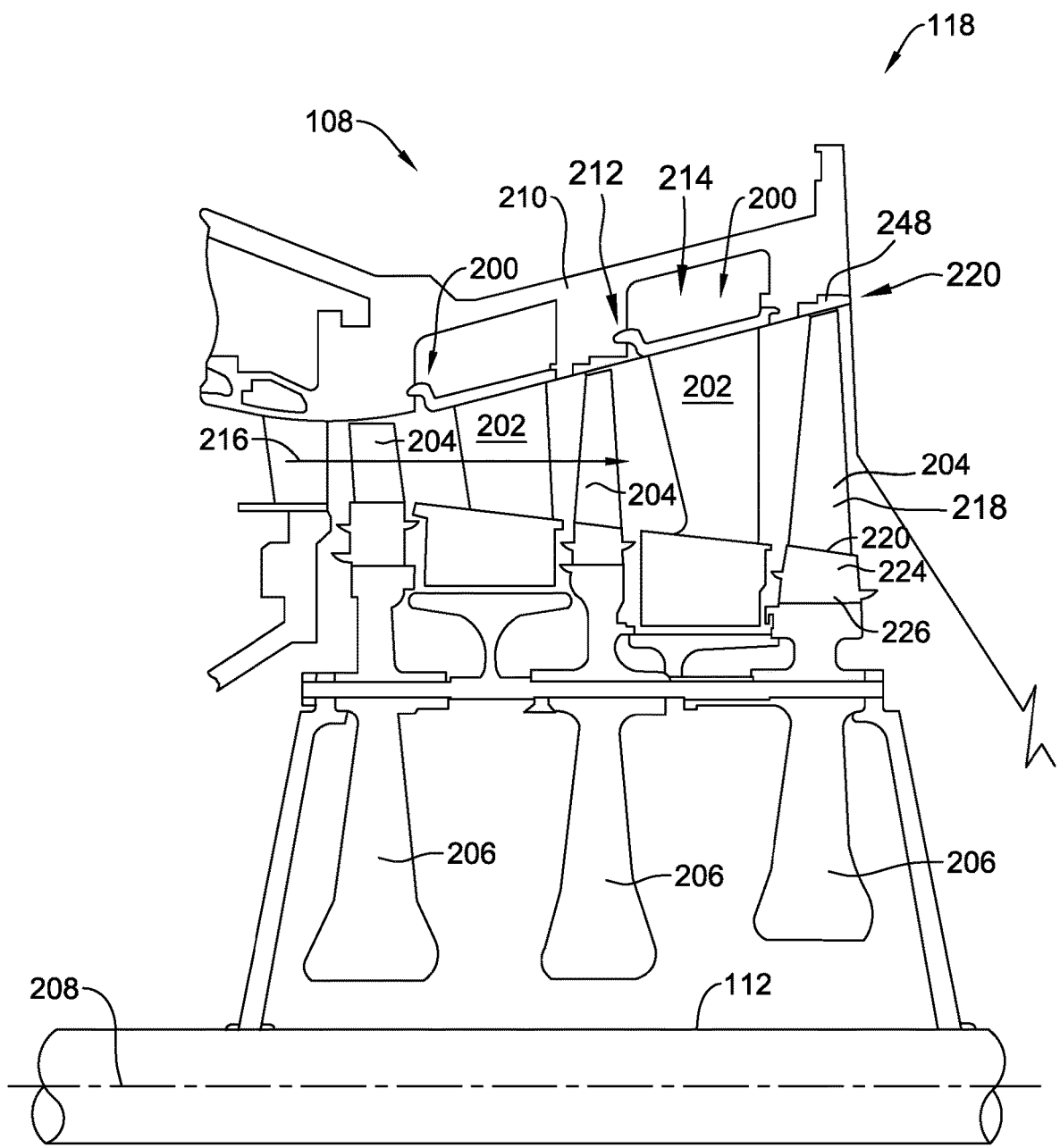
FIG. 2 is a partial sectional view of a portion of an exemplary rotor assembly that may be used with the exemplary rotary machine shown in FIG. 1.

FIG. 2 is a partial sectional view of a portion of an exemplary embodiment of rotor assembly 118. In the exemplary embodiment, turbine section 108 includes a plurality of stages 200 that each include a stationary row 212 of stator vanes 202 and a row 214 of rotating turbine blades 204. Turbine blades 204 in each row 214 are spaced circumferentially about, and extend radially outward from, a rotor disk 206. Each rotor disk 206 is coupled to rotor shaft 112 and rotates about a centerline axis 208 that is defined by rotor shaft 112. A turbine casing 210 extends circumferentially about rotor assembly 118 and stator vanes 202. Stator vanes 202 are each coupled to turbine casing 210 and extend radially inward from casing 210 towards rotor shaft 112. A combustion gas path 216 is defined between turbine casing 210 and each rotor disk 206. Each row 212 and 214 of turbine blades 204 and stator vanes 202 extends at least partially through a portion of combustion gas path 216.

With reference to FIGS. 1 and 2, during operation, intake section 102 channels air towards compressor section 104. Compressor section 104 compresses air and discharges compressed air into combustor section 106 and towards turbine section 108. The majority of air discharged from compressor section 104 is channeled towards combustor section 106. More specifically, pressurized compressed air is channeled to combustors 114 wherein the air is mixed with fuel and ignited to generate high temperature combustion gases. The combustion gases are channeled towards combustion gas path 216, wherein the gases impinge upon turbine blades 204 and stator vanes 202 to facilitate imparting a rotational force on rotor assembly 118.

Figure 3:
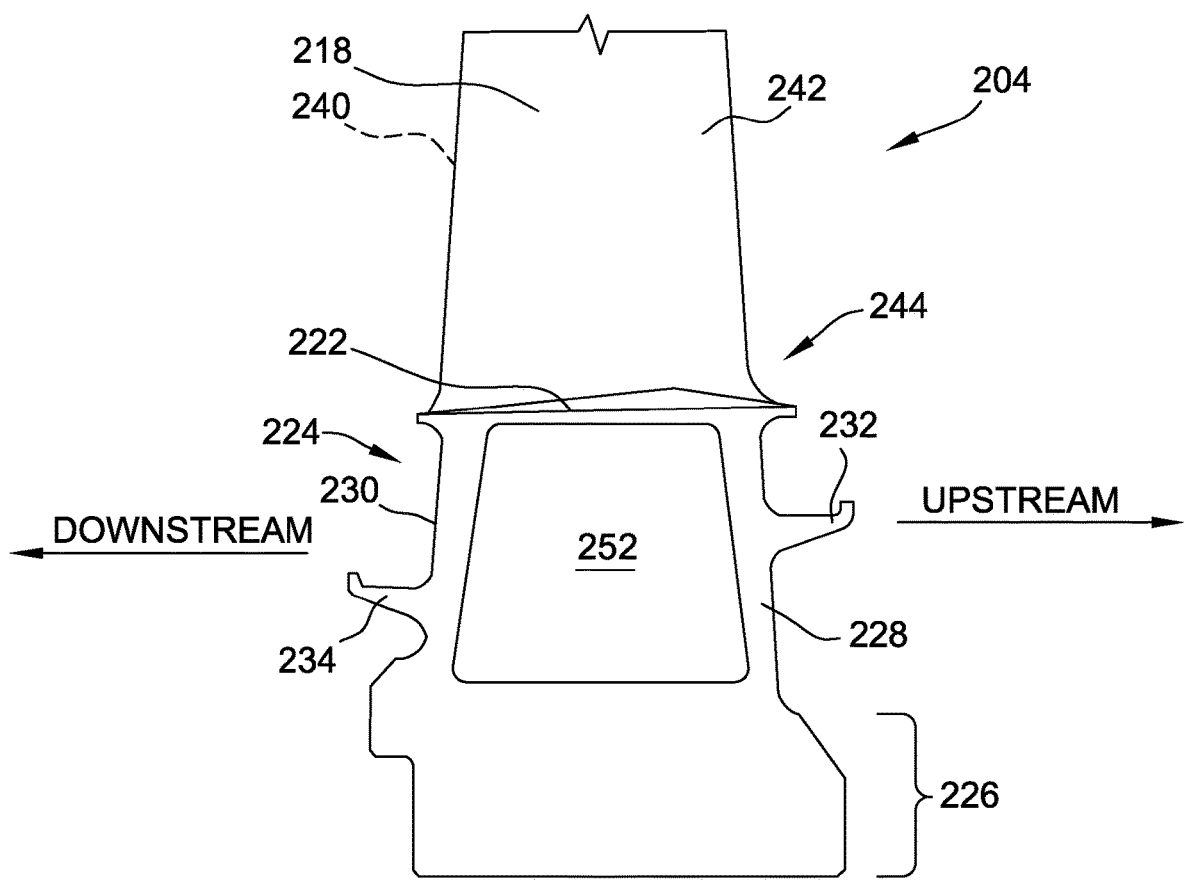
FIG. 3 is a perspective view of a suction side of an exemplary turbine blade that may be used with the rotor assembly shown in FIG. 2.
Figure 4:
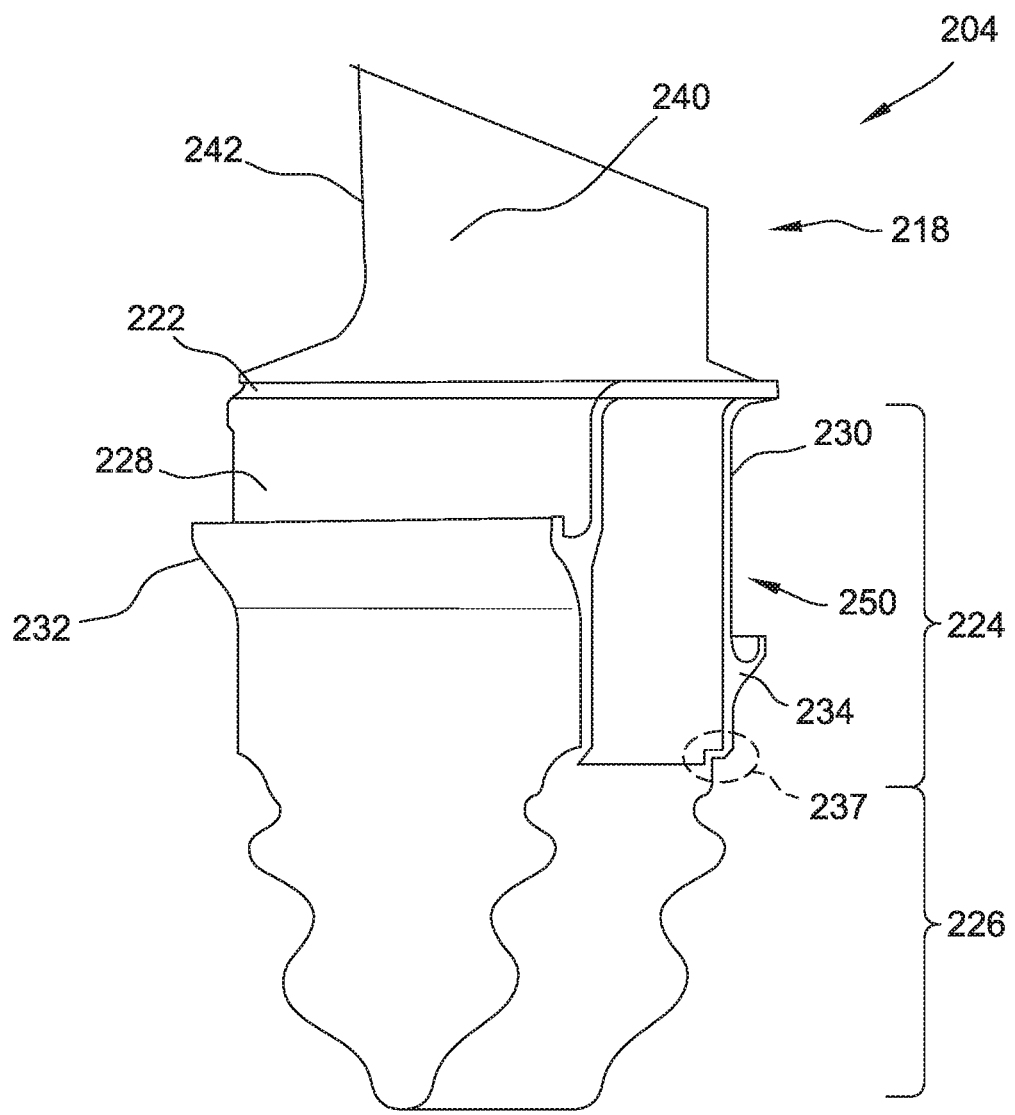
FIG. 4 is a perspective view of an exemplary turbine blade shank, dovetail region, and platform that may be used with the turbine blade shown in FIG. 3.

FIG. 3 is a perspective view of a suction side of an exemplary turbine blade 204. FIG. 4 is a perspective view of an exemplary shank 224, a dovetail region 226, and platform 222 for use with exemplary blade 204. With reference to FIGS. 2-4, in the exemplary embodiment, each turbine blade 204 includes an airfoil 218 that extends radially between a root end 244 and a tip end 220 and defines a pressure side 240 and an opposite suction side 242. Further in the exemplary embodiment, each turbine blade 204 includes a tip shroud 248 coupled to tip end 220 of airfoil 218, platform 222 coupled to root end 244, shank 224 that extends radially inwardly from platform 222, and dovetail region 226 that extends radially inwardly from shank 224 and is shaped to facilitate secure coupling of blade 204 to rotor disk 206. More specifically, in the exemplary embodiment, dovetail region 226 is characterized by a suitable tapered wavy outer surface that is shaped to be received within a complementarily shaped slot (not shown) defined in rotor disk 206. In alternative embodiments, dovetail region 226 includes any suitable shape that enables blade 204 to function as described herein. Platform 222 at least partially defines a radially inner boundary of hot gas path 216. In alternative embodiments, each blade 204 includes any suitable structure that enables blade 204 to function as described herein.

In the exemplary embodiment, shank 224 includes an upstream cover plate 228 and a downstream cover plate 230. Upstream cover plate 228 and downstream cover plate 230 each extend radially between dovetail region 226 and platform 222 and laterally from a pressure side face 250 to an opposite suction side face 252 of shank 224. An upstream angel wing 232 extends axially upstream, relative to hot gas path 216, from upstream cover plate 228, and extends laterally along a face of upstream cover plate 228. A downstream angel wing 234 extends axially downstream from downstream cover plate 230, and extends laterally along a face of downstream cover plate 230. In alternative embodiments, blade 204 includes any suitable number of each of upstream angel wings 232 and downstream angel wings 234, including zero, that enables blade 204 to function as described herein.

A region 237 of blade 204 encompasses, and is defined generally proximate, an intersection of downstream cover plate 230, pressure side face 250, and dovetail region 226. In some embodiments, when blade 204 is in operation in gas turbine 100, a mean stress concentration and a vibratory stress concentration of blade 204 both occur proximate region 237.

Figure 5:
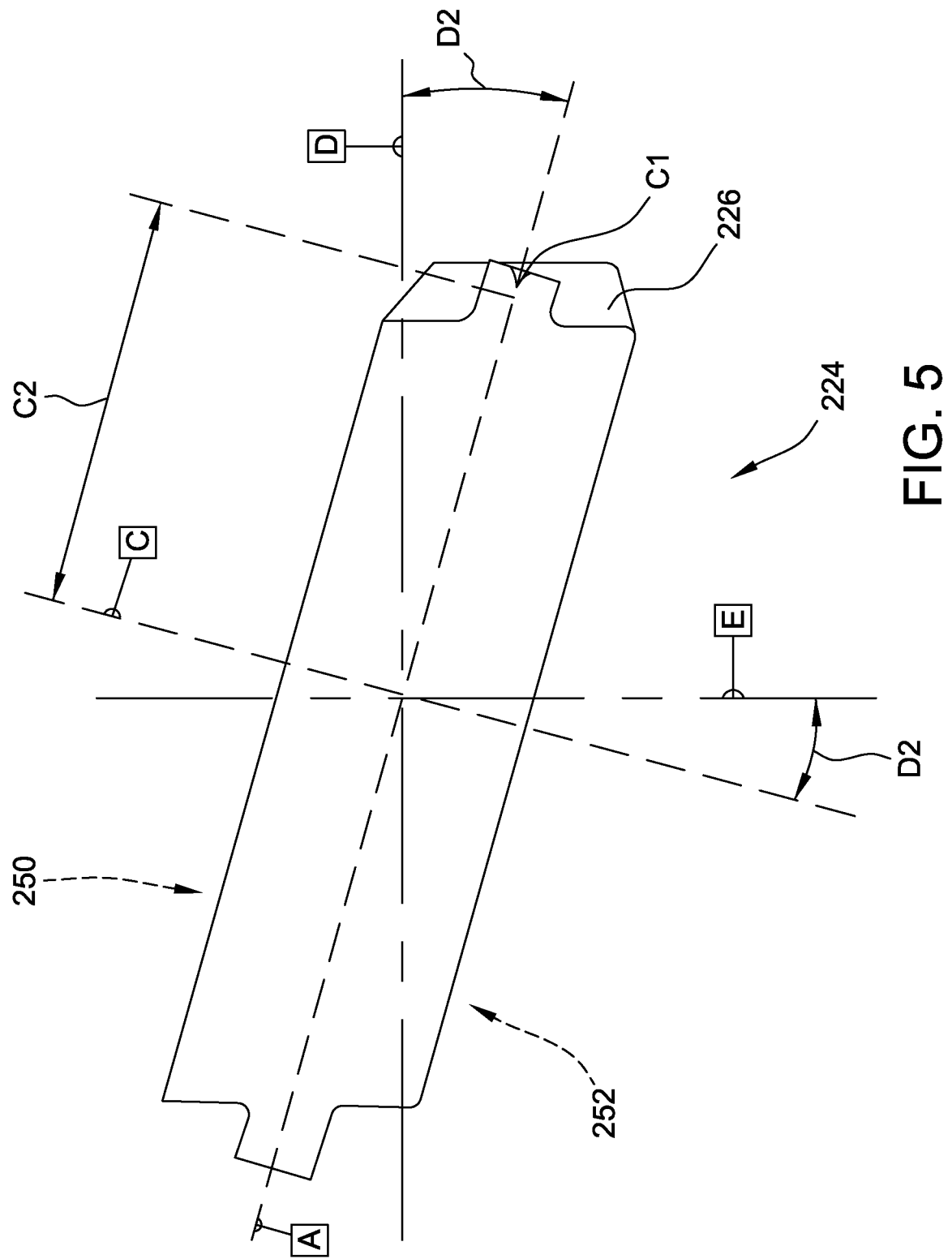
FIG. 5 is sectional view of a shank of the exemplary turbine blade shown in FIG. 3, illustrating a plurality of datums A, C, D, and E defined with respect to the exemplary turbine blade shown in FIG. 3.
Figure 6:
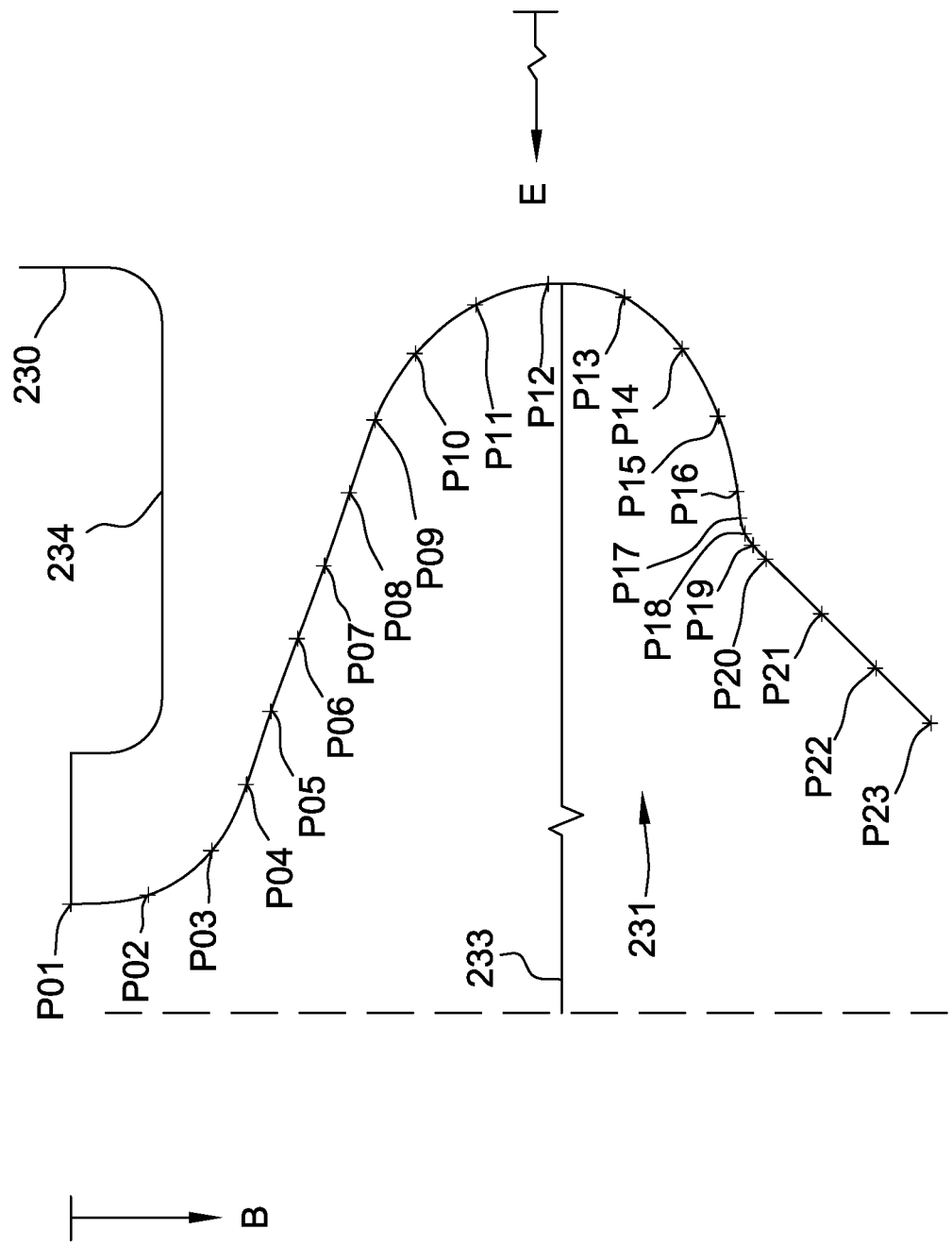
FIG. 6 is a sectional view illustrating an exemplary profile of an underside of a downstream angel wing and a portion of a downstream cover plate of the exemplary turbine blade shown in FIG. 3.

FIG. 5 is sectional view of shank 224 of turbine blade 204 illustrating a plurality of datums A, C, D, and E defined with respect to blade 204. FIG. 6 is a sectional view illustrating a profile 231 of an underside of downstream angel wing 234 and a portion of downstream cover plate 230 radially inward of downstream angel wing 234, illustrating a datum B defined with respect to blade 204. The plurality of datums may be used to establish a location of any point on blade 204, as will be described herein. In the exemplary embodiment, primary datum A is a radially extending plane defined with respect to at least one physical feature of blade 204 such that datum A bisects shank 224. Secondary datum B is a plane defined perpendicular to a radially extending line through airfoil 218, and hence perpendicular to datum A, at a radial location established by a top point of downstream angel wing 234. Tertiary datum C also is a radially extending plane defined perpendicular to each of datum A and datum B, and intersects datum A at a distance C2 from datum target point C1, taken parallel to datum B along datum A as shown in FIG. 5. Finally, a pair of radially extending, orthogonal datums E and D are respective planes rotated at angle D2 in a counterclockwise direction with respect to the view of FIG. 5, from orthogonal datums A and C, about the line of intersection of datums A and C. Datums E, B, and D will be used herein to provide identifiable reference points for a surface of turbine blade 204.

More specifically, profile 231 is defined as a plurality of points identified as P01, P02, . . . , P23 joined with smooth continuous arcs. Table 1 below is an exemplary table of coordinates, relative to datums B, D, and E described above, for plurality of points P01, P02, . . . , P23 for an exemplary embodiment of profile 231. More specifically, with reference to FIGS. 4-6, the values in Table 1 are generated and shown to three decimal places, in inches, based on an exemplary reference distance C2 of 3.203 inches and an exemplary reference angle D2 of 15.5°.

TABLE 1

|  | E | D | B |
|---|---|---|---|
| P01 | 3.456 | 0.000 | 0.000 |
| P02 | 3.443 | 0.000 | 0.132 |
| P03 | 3.369 | 0.000 | 0.242 |
| P04 | 3.251 | 0.000 | 0.301 |
| P05 | 3.125 | 0.000 | 0.345 |
| P06 | 2.999 | 0.000 | 0.389 |
| P07 | 2.873 | 0.000 | 0.433 |
| P08 | 2.747 | 0.000 | 0.477 |
| P09 | 2.621 | 0.000 | 0.522 |
| P10 | 2.508 | 0.000 | 0.592 |
| P11 | 2.424 | 0.000 | 0.695 |
| P12 | 2.386 | 0.000 | 0.822 |
| P13 | 2.411 | 0.000 | 0.951 |
| P14 | 2.498 | 0.000 | 1.051 |
| P15 | 2.615 | 0.000 | 1.115 |
| P16 | 2.744 | 0.000 | 1.147 |
| P17 | 2.792 | 0.000 | 1.151 |
| P18 | 2.817 | 0.000 | 1.157 |
| P19 | 2.840 | 0.000 | 1.172 |
| P20 | 2.862 | 0.000 | 1.195 |
| P21 | 2.957 | 0.000 | 1.290 |
| P22 | 3.051 | 0.000 | 1.384 |
| P23 | 3.146 | 0.000 | 1.479 |

In certain embodiments, a shape of an underside of downstream angel wing 234 and a portion of downstream cover plate 230 radially inward of downstream angel wing 234 is defined by a cylindrical rotation, about a radially extending axis 235 using a cylinder radius 233 parallel to the B datum plane, of profile 231 between pressure side face 250 and opposite suction side face 252 of shank 224. In some such embodiments, it has been determined that shaping the underside of downstream angel wing 234 and the portion of downstream cover plate 230 radially inward of downstream angel wing 234 according to the cylindrical rotation of profile 231 shifts a mean stress concentration and a vibratory stress concentration away from each other proximate region 237 (shown in FIG. 4), as compared to at least some known blades, thereby facilitating a reduced fatigue of blade 204 and improving an operational life cycle of blade 204, while maintaining an acceptable structural performance of blade 204.

Alternatively, in some embodiments, the shape of the underside of downstream angel wing 234 and the portion of downstream cover plate 230 radially inward of downstream angel wing 234 is defined by a straight translation, along an axis approximately perpendicular to the D datum plane, of profile 231 between pressure side face 250 and opposite suction side face 252 of shank 224. In some such embodiments, it has been determined that shaping the underside of downstream angel wing 234 and the portion of downstream cover plate 230 radially inward of downstream angel wing 234 according to the straight translation of profile 231 also shifts the mean stress concentration and the vibratory stress concentration away from each other proximate region 237 (shown in FIG. 4), as compared to at least some known blades, thereby facilitating a reduced fatigue of blade 204 and improving an operational life cycle of blade 204, while maintaining an acceptable structural performance of blade 204. In some embodiments, the relative displacement of the mean stress concentration and the vibratory stress concentration is not as great for the straight translation of profile 231 as for the cylindrical rotation described above, but nevertheless produces a significant advantage over known blades. Moreover, in some such embodiments, forming blade 204 with a straight translation of profile 231 reduces a manufacturing complexity of blade 204 as compared to forming blade 204 with a cylindrical rotation of profile 231.

In addition, certain embodiments include variations in the datum values set forth in Table 1 while preserving the advantages described above to a substantial degree. For example, in some embodiments, at least one of manufacturing tolerances and protective coatings cause each datum value listed in Table 1 to vary within a tolerance of about ±0.030 inches, while preserving the advantages described above to a substantial degree. Accordingly, the values for profile 231 given in Table 1 are for a nominal profile 231, and are subject to a tolerance. It will therefore be appreciated that typical tolerances, i.e., ±values, including any coating thicknesses, are additive to the distance from a given datum given in Table 1.

Moreover, the nominal datum values in Table 1 are applicable as described above to a range of values of angle D2. More specifically, the nominal datum values in Table 1 are applicable as described above to values of angle D2 that are within a range of about ±10 percent from the exemplary value of angle D2 associated with Table 1.

In addition, the nominal datum values in Table 1 are scalable to a range of values of distance C2. More specifically, in embodiments in which datum distance C2 of blade 204 differs from the reference datum distance C2 associated with Table 1, but remains in a range of between about 2.5 inches and about 4.0 inches, each of the values for the E datum in Table 1 can be adjusted by an amount equal to the difference between datum distance C2 and reference datum distance C2, multiplied by the cosine of angle D2 of blade 204, such that the advantages described above are substantially preserved. As an illustrative example, in one embodiment, C2 for an alternative blade 204 is 3.500 inches and angle D2 remains 15.5°, and each of the values for the E datum in FIG. 7 are adjusted by an amount equal to the difference between datum distance C2 and reference datum distance C2, multiplied by the cosine of angle D2, that is, by (3.500−3.203)*cos(15.5°)=0.291 inches.

Figure 7:
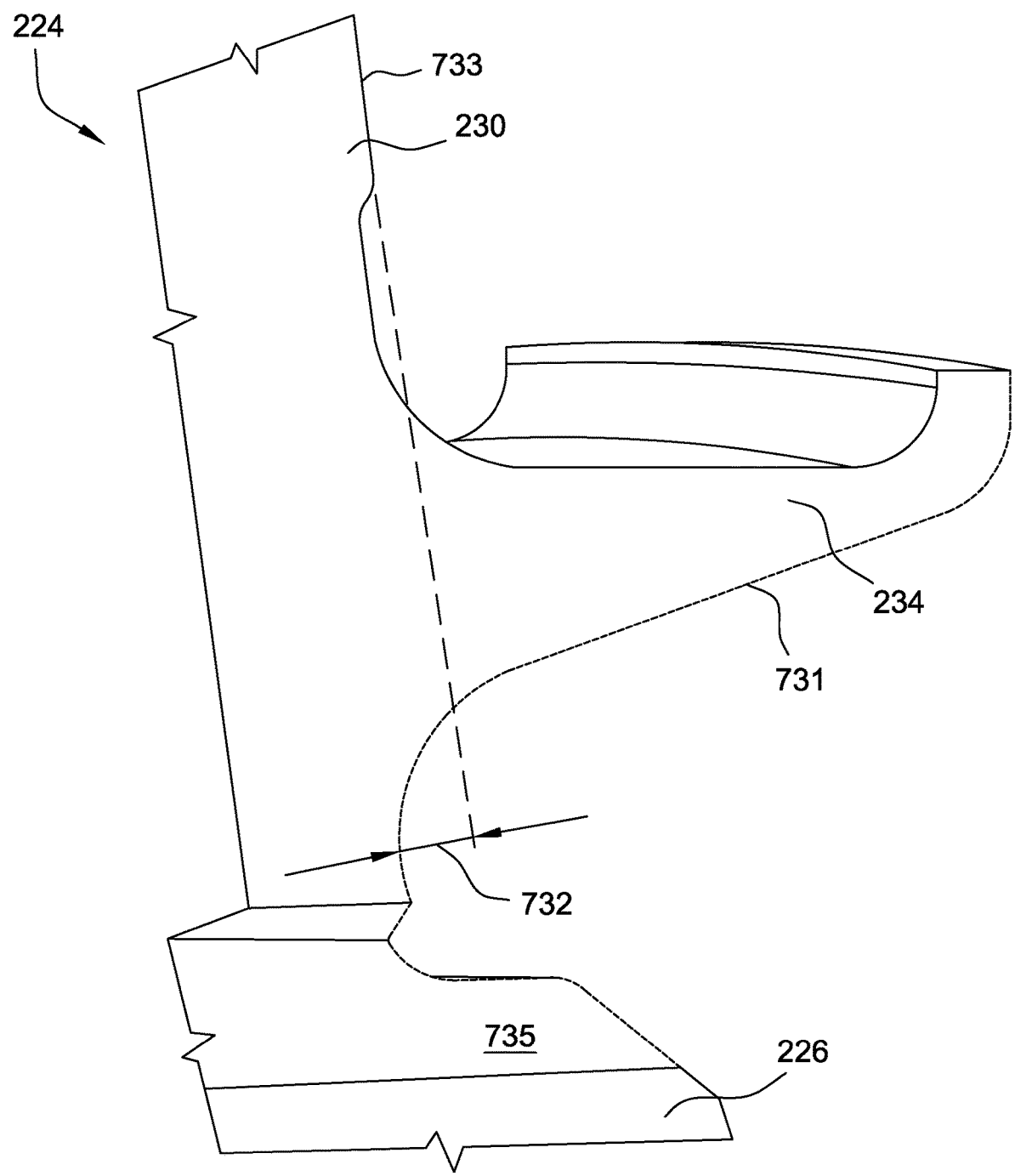
FIG. 7 is a schematic perspective view of another exemplary profile of a shank of the turbine blade shown in FIG. 3.

FIG. 7 is a schematic perspective view of another exemplary profile 731 (illustrated as a dashed line) of shank 224. In the exemplary embodiment, a portion of downstream cover plate 230 radially outward of downstream angel wing 234 defines an approximately linear profile 733, and profile 731 of a portion of downstream cover plate 230 radially inward of downstream angel wing 234 is recessed by a distance 732 relative to linear profile 733. For example, the recessed portion is adjacent to a generally axially extending region 735 of shank 224 that interfaces with dovetail region 226.

In some embodiments, a shape of an underside of downstream angel wing 234 and a portion of downstream cover plate 230 radially inward of downstream angel wing 234 is defined by a cylindrical rotation of profile 731 between pressure side face 250 and opposite suction side face 252 of shank 224, as described above. In alternative embodiments, the shape of the underside of downstream angel wing 234 and the portion of downstream cover plate 230 radially inward of downstream angel wing 234 is defined by a straight translation of profile 731 between pressure side face 250 and opposite suction side face 252 of shank 224, as described above. In some such embodiments, it has been determined that recessing the portion of profile 731 radially inward of downstream angel wing 234, relative to radially outward linear profile 733, shifts the mean stress concentration and the vibratory stress concentration away from each other proximate region 237 (shown in FIG. 4), as compared to blade 204 having the portion of profile 731 radially inward of downstream angel wing 234 substantially co-linear with linear profile 733, thereby facilitating a reduced fatigue of blade 204 and improving an operational life cycle of blade 204, while maintaining an acceptable structural performance of blade 204.

For example, in some embodiments, recess distance 732 is in a range of from about 0.010 inches to about 0.050 inches, and yields a significant benefit in shifting the mean stress concentration and the vibratory stress concentration away from each other proximate region 237. In some such embodiments, recess distance 732 is about 0.035 inches, and yields a particular benefit in shifting the mean stress concentration and the vibratory stress concentration away from each other proximate region 237. In alternative embodiments, recess distance 732 is any suitable distance that enables blade 204 to function as described herein.

Figure 8:
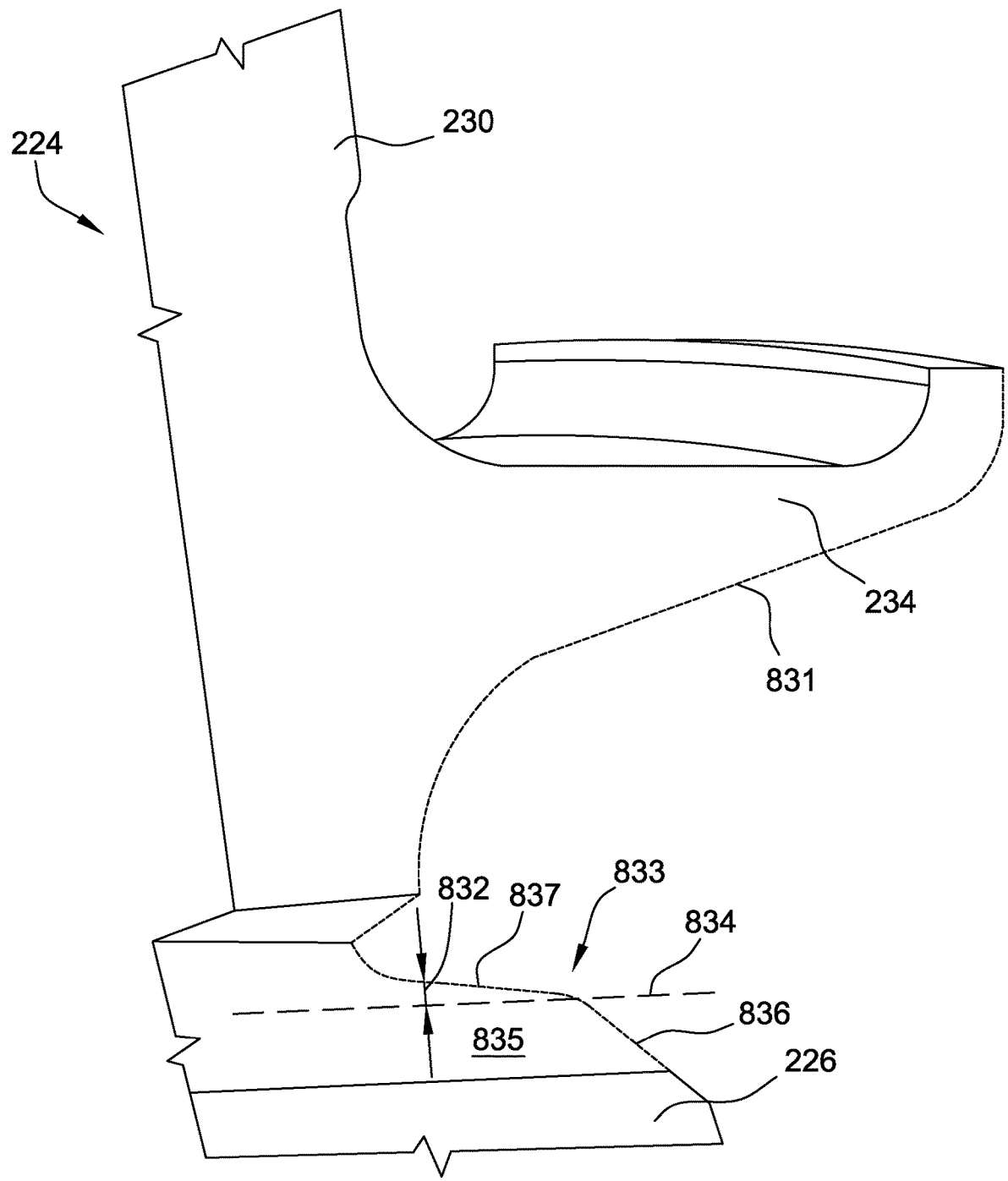
FIG. 8 is a schematic perspective view of yet another exemplary profile of a shank of the turbine blade shown in FIG. 3.

FIG. 8 is a schematic perspective view of another exemplary profile 831 (illustrated as a dashed line) of shank 224. Shank 224 includes a generally axially extending region 835 that interfaces with dovetail region 226. Axially extending region 835 includes an inflection point 833, a first surface 836 that slopes radially inward from inflection point 833 to dovetail region 226, and a second surface 837 that extends generally axially from inflection point 833 opposite first surface 836. A plane 834 is defined through inflection point 833 perpendicular to the radial direction of blade 204. In the exemplary embodiment, a central portion of second surface 837 slopes radially outward from inflection point 833, such that the central portion of second surface 837 defines a thickness 832 radially outward of plane 834.

In some embodiments, a shape of an underside of downstream angel wing 234 and a portion of downstream cover plate 230 radially inward of downstream angel wing 234 is defined by a cylindrical rotation of profile 831 between pressure side face 250 and opposite suction side face 252 of shank 224, as described above. In alternative embodiments, the shape of the underside of downstream angel wing 234 and the portion of downstream cover plate 230 radially inward of downstream angel wing 234 is defined by a straight translation of profile 831 between pressure side face 250 and opposite suction side face 252 of shank 224, as described above. In some such embodiments, it has been determined that radially outward sloping second surface 837, defining thickness 832 above plane 834, shifts the mean stress concentration and the vibratory stress concentration away from each other proximate region 237 (shown in FIG. 4), as compared to blade 204 having the central portion of second surface 837 substantially co-planar with plane 834, thereby facilitating a reduced fatigue of blade 204 and improving an operational life cycle of blade 204, while maintaining an acceptable structural performance of blade 204.

For example, in some embodiments, thickness 832 is in a range of from about 0.015 inches to about 0.035 inches, and yields a significant benefit in shifting the mean stress concentration and the vibratory stress concentration away from each other proximate region 237. In some such embodiments, thickness 832 is about 0.025 inches, and yields a particular benefit in shifting the mean stress concentration and the vibratory stress concentration away from each other proximate region 237. In alternative embodiments, thickness 832 is any suitable distance that enables blade 204 to function as described herein.

In addition, with reference to FIGS. 7 and 8, in certain embodiments, recess distance 732 and thickness 832 provided in combination result in an enhanced relative displacement of the mean stress concentration and the vibratory stress concentration proximate region 237 (shown in FIG. 4), as compared to providing solely one of recess distance 732 and thickness 832. Nevertheless, substantial benefits are still obtainable by providing solely one of recess distance 732 and thickness 832. Moreover, in all such embodiments, relative displacement of the mean stress concentration and the vibratory stress concentration proximate region 237 is obtained without modification of a design of dovetail region 226, thereby facilitating an avoidance of any requirement to modify a slot (not shown) defined in rotor disk 206 to receive a preselected shape of dovetail region 226.

Moreover, in certain embodiments, recess distance 732 and thickness 832 provided in combination result in a profile identical to profile 231, as discussed above, including scaling and manufacturing tolerances. In some such embodiments, profile 231 including recess distance 732 and thickness 832 results in a particularly advantageous relative displacement of the mean stress concentration and the vibratory stress concentration proximate region 237, and thus a particularly advantageous reduction of fatigue on blade 204, while maintaining an acceptable structural performance of blade 204. In alternative embodiments, substantial advantages are obtained with recess distance 732 and thickness 832 implemented as other than profile 231.

The above-described embodiments of turbine blades overcome at least some disadvantages of known turbine blades. Specifically, a profile of an underside of a downstream angel wing and/or a portion of a downstream cover plate radially inward of the downstream angel wing facilitates separating and/or reducing a mean stress concentration and a vibratory stress concentration proximate an intersection of the downstream cover plate, a pressure side face, and a dovetail of the blade. In at least some embodiments, these benefits are achieved without any effect on a design of the dovetail. Thus, a rotor disk made for a selected dovetail design need not be modified to accommodate such embodiments of the blade.

Exemplary embodiments of a turbine blade for use in a gas turbine engine are described above in detail. The and apparatus are not limited to the specific embodiments described herein, but rather, components of systems may be utilized independently and separately from other components described herein. For example, the apparatus may also be used in combination with other rotary machines and methods, and are not limited to practice with only the gas turbine engine assembly as described herein. Rather, the exemplary embodiment can be implemented and utilized in connection with many other rotary machine applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine blade comprising:
   an airfoil that extends radially between a root end and a tip end;
   a platform coupled to said root end;
   a shank that extends radially inwardly from said platform, said shank comprising a pressure side face, an opposite suction side face and a downstream cover plate extending therebetween, said shank further comprising a downstream angel wing that extends axially from said downstream cover plate, wherein a portion of said downstream cover plate radially outward of said downstream angel wing defines an approximately linear profile; and
   a dovetail region that extends radially inwardly from said shank, wherein a profile of a portion of said downstream cover plate radially inward of said downstream angel wing is recessed relative to said linear profile, and wherein a shape of said portion of said downstream cover plate radially inward of said downstream angel wing is defined by at least one of (i) a cylindrical rotation of said profile of said radially inward portion between said pressure side face and said suction side face and (ii) a straight translation of said profile of said radially inward portion between said pressure side face and said suction side face.

2. The turbine blade according to claim 1, wherein said recessed portion of said downstream cover plate is adjacent to a generally axially extending region of said shank that interfaces with said dovetail region.

3. The turbine blade according to claim 1, wherein said recessed portion of said downstream cover plate is recessed a distance in a range of from about 0.010 inches to about 0.050 inches relative to said linear profile.

4. The turbine blade according to claim 1, wherein said recessed portion of said downstream cover plate is recessed a distance of about 0.035 inches relative to said linear profile.

5. The turbine blade according to claim 1, wherein said shank further comprises a generally axially extending region that interfaces with said dovetail region, said axially extending region comprises an inflection point, a first surface that slopes radially inward from said inflection point to said dovetail region, and a second surface that extends generally axially from said inflection point opposite said first surface, and wherein a central portion of said second surface slopes radially outward from said inflection point.

6. The turbine blade according to claim 5, wherein said central portion of said second surface defines a thickness radially outward of a plane defined through said inflection point, the plane perpendicular to a radial direction of said blade.

7. The turbine blade according to claim 1, wherein said profile of said portion of said downstream cover plate radially inward of said downstream angel wing is defined by a plurality of points having coordinates listed in Table 1 subject to a tolerance of about ±0.030 inches, the plurality of points joined with smooth continuous arcs, wherein each of the coordinates for the E datum in Table 1 is adjusted based on a difference between a datum distance C2 of the turbine blade and a reference datum distance C2 associated with Table 1.

8. A turbine blade comprising:
   an airfoil that extends radially between a root end and a tip end;
   a platform coupled to said root end;
   a shank that extends radially inwardly from said platform, said shank comprising a pressure side face, an opposite suction side face and a downstream cover plate extending therebetween, said shank further comprising a downstream cover plate and a downstream angel wing that extends axially from said downstream cover plate; and
   a dovetail region that extends radially inwardly from said shank, wherein said shank further comprises a generally axially extending region that interfaces with said dovetail region, a profile of said axially extending region comprises an inflection point, a first surface that slopes radially inward from said inflection point to said dovetail region, and a second surface that extends generally axially from said inflection point opposite said first surface, a central portion of said second surface slopes radially outward from said inflection point, and wherein a shape of said portion of said axially extending region is defined at least one of by (i) a cylindrical rotation of said profile between said pressure side face and said suction side face and (ii) a straight translation of said profile between said pressure side face and said suction side face.

9. The turbine blade according to claim 8, wherein said central portion of said second surface defines a thickness radially outward of a plane defined through said inflection point, the plane perpendicular to a radial direction of said blade.

10. The turbine blade according to claim 9, wherein said thickness is in a range of from about 0.015 inches to about 0.035 inches.

11. The turbine blade according to claim 9, wherein said thickness is about 0.025 inches.

12. The turbine blade according to claim 8, wherein said profile of said axially extending region is defined by a plurality of points having coordinates listed in Table 1 subject to a tolerance of about ±0.030 inches, the plurality of points joined with smooth continuous arcs, wherein each of the coordinates for the E datum in Table 1 is adjusted based on a difference between a datum distance C2 of the turbine blade and a reference datum distance C2 associated with Table 1.

13. A turbine blade comprising:
    an airfoil that extends radially between a root end and a tip end;
    a platform coupled to said root end;
    a shank that extends radially inwardly from said platform, said shank comprising a downstream cover plate and a downstream angel wing that extends axially from said downstream cover plate; and
    a dovetail region that extends radially inwardly from said shank, wherein a profile of an underside of said downstream angel wing and a portion of said downstream cover plate radially inward of said downstream angel wing is defined by a plurality of points having coordinates listed in Table 1 subject to a tolerance of about ±0.030 inches, said plurality of points joined with smooth continuous arcs, wherein each of the coordinates for the E datum in Table 1 is adjusted based on a difference between a datum distance C2 of said turbine blade and a reference datum distance C2 associated with Table 1.

14. The turbine blade according to claim 13, wherein said shank further comprises a pressure side face and an opposite suction side face, said downstream cover plate extending therebetween, and wherein a shape of said underside of said downstream angel wing and said portion of said downstream cover plate radially inward of said downstream angel wing is defined by a cylindrical rotation of said profile between said pressure side face and said suction side face.

15. The turbine blade according to claim 13, wherein said shank further comprises a pressure side face and an opposite suction side face, said downstream cover plate extending therebetween, and wherein a shape of said underside of said downstream angel wing and said portion of said downstream cover plate radially inward of said downstream angel wing is defined by a straight translation of said profile between said pressure side face and said suction side face.

16. The turbine blade according to claim 13, wherein said turbine blade has a datum distance C2 substantially equal to the reference datum distance C2 associated with Table 1.

* * * * *